US009206908B2

(12) United States Patent
Howard et al.

(10) Patent No.: US 9,206,908 B2
(45) Date of Patent: Dec. 8, 2015

(54) PIN MECHANISM

(71) Applicant: G.W. Lisk Company, Inc., Clifton Springs, NY (US)

(72) Inventors: George F. Howard, Cape Vincent, NY (US); Michael T. Levis, Clifton Springs, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 60 days.

(21) Appl. No.: 14/291,625

(22) Filed: May 30, 2014

(65) Prior Publication Data
US 2014/0270928 A1 Sep. 18, 2014

Related U.S. Application Data

(63) Continuation-in-part of application No. 14/236,479, filed as application No. PCT/US2011/066836 on Dec. 22, 2011, now abandoned.

(60) Provisional application No. 61/514,145, filed on Aug. 2, 2011.

(51) Int. Cl.
*A62C 37/36* (2006.01)
*F16K 1/00* (2006.01)
*A62C 13/76* (2006.01)

(52) U.S. Cl.
CPC . *F16K 1/00* (2013.01); *A62C 37/04* (2013.01); *A62C 13/76* (2013.01); *Y10T 403/602* (2015.01)

(58) Field of Classification Search
CPC ..... A62C 37/04; A62C 13/76; Y10T 403/602
USPC ............ 251/68; 74/2; 239/453, 533.7, 585.1; 169/14, 19
See application file for complete search history.

(56) References Cited

U.S. PATENT DOCUMENTS

| 1,510,445 | A | * | 9/1924 | Henry | E05B 3/121 |
| | | | | | 74/2 |
| 2,259,257 | A | * | 10/1941 | Macblane | B21D 22/00 |
| | | | | | 192/134 |
| 3,468,169 | A | | 9/1969 | Welch | |
| 3,543,603 | A | * | 12/1970 | Gley | A61M 5/24 |
| | | | | | 604/138 |
| 3,563,098 | A | * | 2/1971 | Gley | A61M 5/2033 |
| | | | | | 604/135 |

(Continued)

OTHER PUBLICATIONS

International Search Report for PCT/US2011/066836 issued on Jul. 2, 2012.

*Primary Examiner* — Marina Tietjen
*Assistant Examiner* — Umashankar Venkatesan
(74) *Attorney, Agent, or Firm* — Brown & Michaels, PC

(57) ABSTRACT

A pin release mechanism which includes a release pin, a bias spring, a spring guide, a moveable ball retainer and a solenoid assembly. The release pin is axially movable from a first to a second position. The bias spring is connected to the release pin and exerts a force biasing the release pin towards the second position. The spring guide receives the bias spring interacts with ball bearings. The moveable ball retainer is connected to the bias spring and has a locked position in which ball bearings radially interfere with the movement of the release pin and prevents movement of the release pin from the first to the second position by engaging the release pin, and an unlocked position in which the ball bearings may move radially, disengaging the release pin, and engaging the ball retainer, to allow the release pin to move from the first towards the second position.

4 Claims, 5 Drawing Sheets

(56) References Cited

U.S. PATENT DOCUMENTS

| | | |
|---|---|---|
| 3,730,005 A | 5/1973 | Hjermstad et al. |
| 4,004,488 A | 1/1977 | Williams |
| 4,614,097 A | 9/1986 | Signorelli |
| 4,635,452 A | 1/1987 | Agbay |
| 4,688,438 A | 8/1987 | Bohler et al. |
| 4,891,994 A | 1/1990 | Barba |
| 5,055,643 A | 10/1991 | Pardini et al. |
| 5,207,618 A * | 5/1993 | Nishizawa .......... B60R 22/1953 280/806 |
| 5,658,087 A | 8/1997 | Butkovich |
| 5,771,742 A * | 6/1998 | Bokaie .................... A64G 1/22 337/140 |
| 7,201,619 B1 | 4/2007 | Viggiano et al. |
| 7,553,205 B2 * | 6/2009 | LoSchiavo ............ B63C 9/0005 440/1 |
| 2012/0318534 A1 | 12/2012 | Dahlgren et al. |

* cited by examiner

PIN MECHANISM

REFERENCE TO RELATED APPLICATIONS

This application is a continuation in part of application Ser. No. 14/236,479, entitled "PIN MECHANISM", which was filed on Jan. 31, 2014, which is the National Stage of International Application No. PCT/US2011/066836, entitled "PIN MECHANISM", which was filed on Dec. 22, 2011, which claims the benefit of Provisional Application No. 61/514,145, filed Aug. 2, 2011. The aforementioned applications are hereby incorporated herein by reference.

BACKGROUND OF THE INVENTION

1. Field of the Invention

The invention pertains to the field of pin mechanisms. More particularly, the invention pertains to a pin mechanism for releasing a pin.

2. Description of Related Art

FIGS. 1-2 show a prior art solenoid actuator in a released position and an unreleased position respectively.

The solenoid actuator has a housing 101 with a first bore 102 for slidably receiving a release pin 117 and a second bore 120 for receiving a solenoid assembly 121.

The release pin 117 has a collar 122 that slides along the surface of the first bore 102 of the housing 101 and a shaft portion 123 that is slidably received within a cap 103 closing off the first bore 102 of the housing 101. A release spring 106 is present between the release pin 117 and the cap 103.

Between the collar 122 and the shaft portion 123 of the release pin 117 is a neck portion 124. A ramp section or angled surface 125 is present between the collar 122 and the neck portion 124 of the release pin 117.

Slidably received within an open bore 107 of the neck portion 124 of the release pin 117 is a detent retainer 114. The detent retainer 114 has an inner surface defining a bore 118 for receiving a release spool 109. The inner surface of the bore 118 of the detent retainer 114 includes a straight surface 126 which is connected to an angled ramp section 119.

The release spool 109 has a cavity 127 which receives a first ball bearing 115a attached to a second ball bearing 115b through a retention spring 116. The release spool 109 is also coupled to a first end 113a of a push rod 113.

The solenoid assembly 121 received within the second bore 120 of the housing 101 includes at least one coil 111 connected to a power source (not shown), a solenoid spool 110, and a moveable armature 112. Connected to the moveable armature 112 is a second end 113b of a push rod 113.

In the unreleased position, as shown in FIG. 2, the collar 122 of the release pin 117 is not in contact with the end of the first bore 102 and the release spring 106 is compressed between the collar 122 of the release pin 117 and the cap 103. The release pin 117 is maintained in this position by the first and second ball bearings 115a, 115b engaging the angled surface 125 of the collar 122 of the release pin 117 and the flat surface 126 of the detent retainer 114. The first and second ball bearings 115a, 115b are held against the angled surface 125 of the collar 122 and the straight surface 126 of the detent retainer 124 by the retention spring 116.

To move the solenoid actuator to a released position as shown in FIG. 1, at least one coil 111 of the solenoid assembly 121 is energized and pulls the armature 112 away from the cap 103. Movement of the armature 112 moves the push rod 113 away from the cap 103, pulling the release spool 109 away from the cap 103. The movement of the release spool 109 allows the first and second ball bearings 115a, 115b to travel from the straight surface 126 of the detent retainer 114 to the ramp section 119 of the detent retainer 114, compressing the retention spring 116 between the ball bearings 115a, 115b. The movement of the first and second ball bearings 115a, 115b to the ramp section 119 of the detent retainer 114 removes any force on the collar 122 of the release pin 117, allowing the release spring 106 to move the release pin 117 to a position where the collar 122 is in contact with the end of the first bore 101.

The solenoid actuator of FIGS. 1-2 is resettable by moving the shaft portion 123 of the release pin 117 in a direction away from the solenoid assembly 121. The movement of the shaft portion 123 of the release pin 117 in this direction allows the retention spring 116 to bias the ball bearings 115a, 115b outwards to contact the ramp section 125 of the detent retainer 114 and to eventually come in contact with the angled surface 125 of the collar 122 of the release pin 117 as shown in FIG. 2.

It should be noted that there is not a bias force that acts directly on the push rod 113 that moves the armature 112 of the solenoid assembly 121.

FIG. 3 shows another prior art solenoid actuator in an unreleased position. The solenoid actuator has a housing 201 with a first bore 202 for slidably receiving a release pin 217 and a second bore 220 for receiving a solenoid assembly 221.

The release pin 217 has a collar 222 that slides along the inner surface of the first bore 202 of the housing 201 and a shaft portion 223 that is slidably received within a cap 203 closing off the first bore 202 of the housing 201. A release spring 206 is present between the release pin 217 and the cap 203.

Between the collar 222 and the shaft portion 223 of the release pin 217 is a neck portion 224. A ramp section or angled surface 225 is present between the collar 222 and the neck portion 224 of the release pin 217.

Slidably received within an open bore 207 of the neck portion 224 of the release pin 217 is a detent retainer 214. The detent retainer 214 has an inner surface defining a bore 218 for receiving a release spool 209. A circumferential groove 230 with straight edges 231 present along an outer surface of the detent retainer 214 and receive ball bearings 215. A compression spring 232 is present between the detent retainer 214 and the release spool 209, linking the detent retainer 214 to the release spool 209.

On the outer circumference of the release spool 209 is a groove section 234 including a ramp 235 between two straight surfaces 240, 241. The ball bearings may travel from straight surface 240 to the ramp 235 and come to rest on straight surface 241 as the release spool 209 slides within the bore 218 of the detent retainer 214. The detent retainer 214 is also coupled to a first end 213a of a push rod 213.

The solenoid assembly 221 includes at least one coil 211 connected to a power source (not shown), a solenoid spool 210, a moveable armature 212 and a stop 236. The second end 213b of the push rod 213 is connected to the moveable armature 212 and is slidably received by the stop 236. The movement of the armature 212 towards the release pin 217 is limited by the stop 236. Another compression spring 237, with the same spring force as the compression spring 232 between the detent retainer 214 and release spool 209 is present between the moveable armature 212 and the second bore 220 of the housing 201.

In an unreleased position, the collar 222 of the release pin 217 is not in contact with the end of the first bore 202 and the release spring 206 is compressed between the collar 222 of the release pin 217 and the cap 203. The release pin 217 is maintained in this position by the ball bearings 215 engaging the angled surface 225 of the collar 222 of the release pin 217, a straight edge 231 of the detent retainer 214, and a straight surface 240 of the groove section of the release spool.

To move the solenoid actuator to a released position (not shown), at least one coil 211 of the solenoid assembly 221 is energized and pushes the armature towards the cap 203. The movement of the armature 212 moves the push rod 213 towards the cap 203, pushing the detent retainer 214 and the release spool 209 towards the cap 203. The movement of the detent retainer 214 and the release spool 209 allows the ball bearings 215 to travel from the straight surface 240 to the ramp 235 and come to rest on straight surface 241 of the release spool 209. The movement of the ball bearings 215 to the ramp 235 of the release spool 209 removes any force on the collar 222 of the release pin 217, allowing the release spring 206 to move the release pin 217 to a position where the collar 222 is in contact with the end of the first bore 202.

The spring 232 between an end of the second bore 220 and the armature 212 provides a source of bias or spring force on the armature 212 that is specifically counteracted by the spring force of the spring 237 present between the release spool 209 and detent retainer 214. Therefore, a spring force that is in the direction of armature 212 movement that is not counteracted is not present.

SUMMARY OF THE INVENTION

A pin release mechanism which includes a release pin, a bias spring, a spring guide, a moveable ball retainer and a solenoid assembly. The release pin is axially movable from a first position to a second position. The bias spring is connected to the release pin and exerts a force biasing the release pin towards the second position. The spring guide receives the bias spring and has a plurality of notches for interacting with a plurality of ball bearings. The moveable ball retainer is connected to the bias spring and has a locked position in which a plurality of ball bearings radially interfere with the movement of the release pin and prevent movement of the release pin from the first position to a second position by engaging the release pin, and an unlocked position in which the plurality of ball bearings may move radially, disengaging the release pin, and engaging the ball retainer, to allow the release pin to move from the first position towards the second position. The solenoid assembly includes a movable armature coupled to the ball retainer for moving the ball retainer between the locked position and the unlocked position; an armature spring exerting a spring force biasing the movable armature to move the ball retainer toward the unlocked position; a permanent magnet exerting a magnetic force on the movable armature, attracting the movable armature to move the ball retainer toward the locked position, the magnetic force of the permanent magnet on the movable armature being sufficient to overcome the spring force of the armature spring to hold the movable armature with the ball retainer in the locked position; and a coil, which when energized exerts a magnetic force on the movable armature opposite to the magnetic force of the permanent magnet, such that when the coil is energized, the magnetic force of the permanent magnet is overcome, allowing the spring force of the armature spring to move the ball retainer toward the unlocked position, permitting movement of the release pin from the first position to the second position by the force of the bias spring.

DETAILED DESCRIPTION OF THE INVENTION

Figure 1:
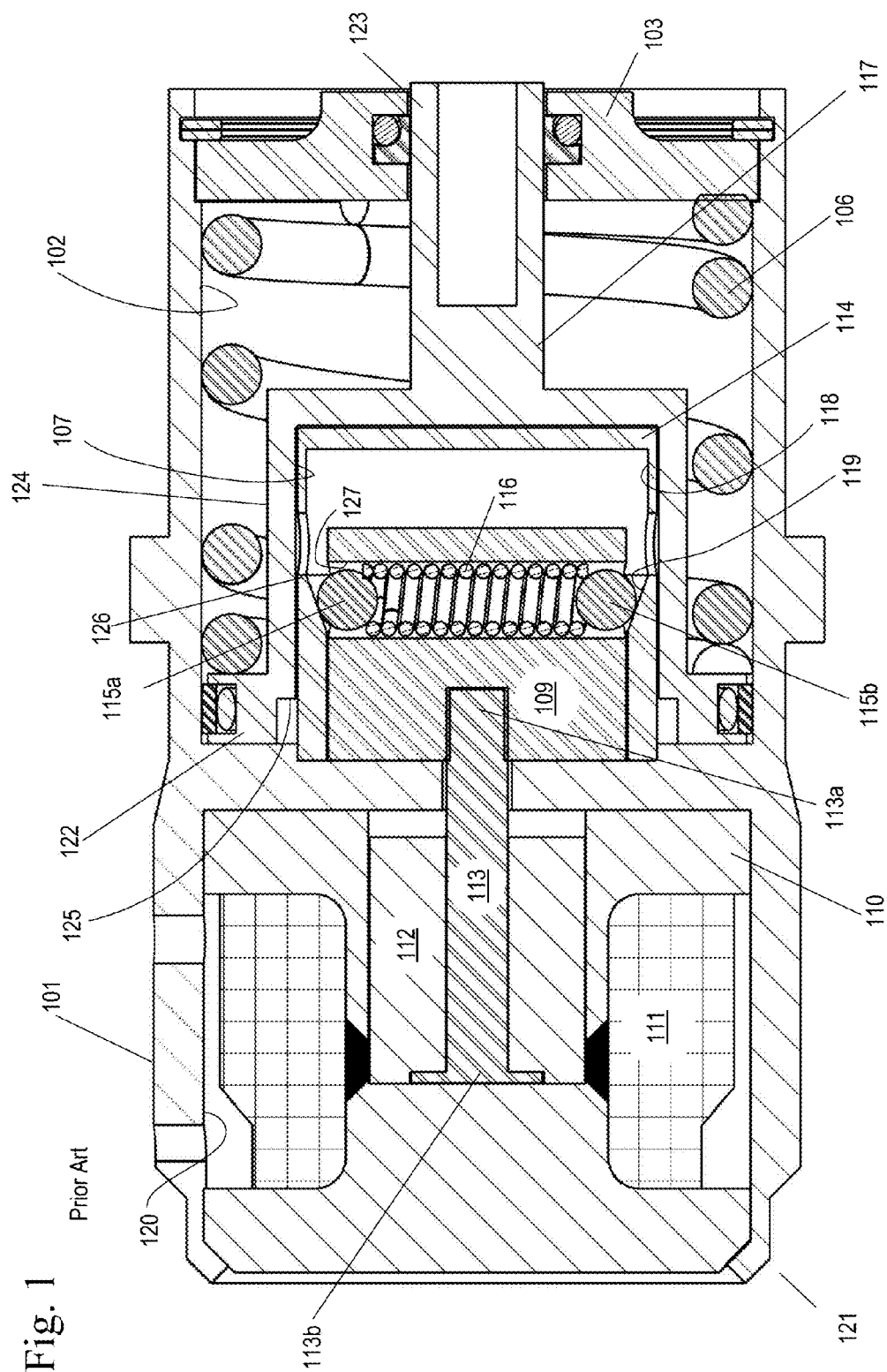
FIGS. 1-2 show a released and an unreleased position of a prior art actuator.
Figure 2:
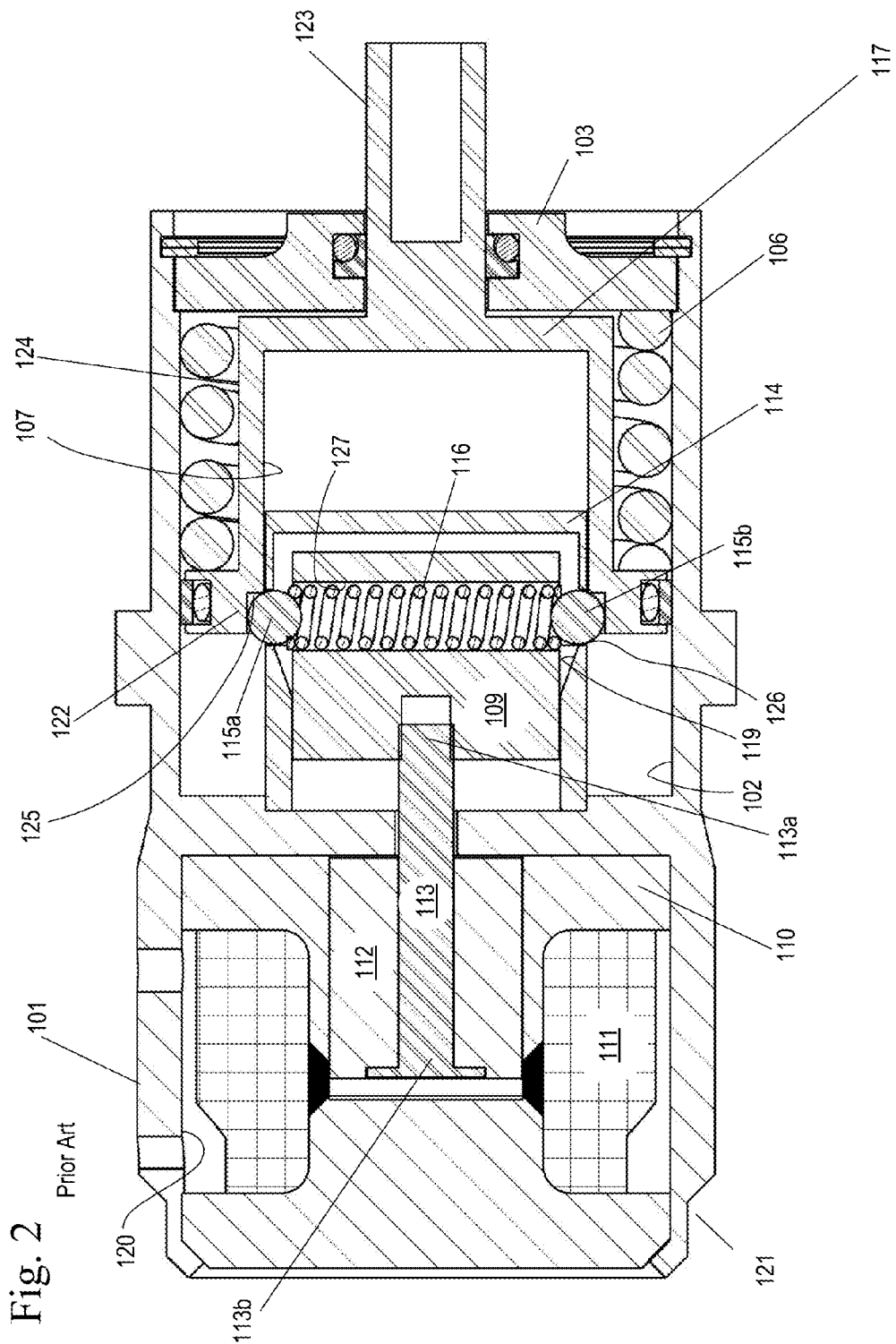
Figure 3:
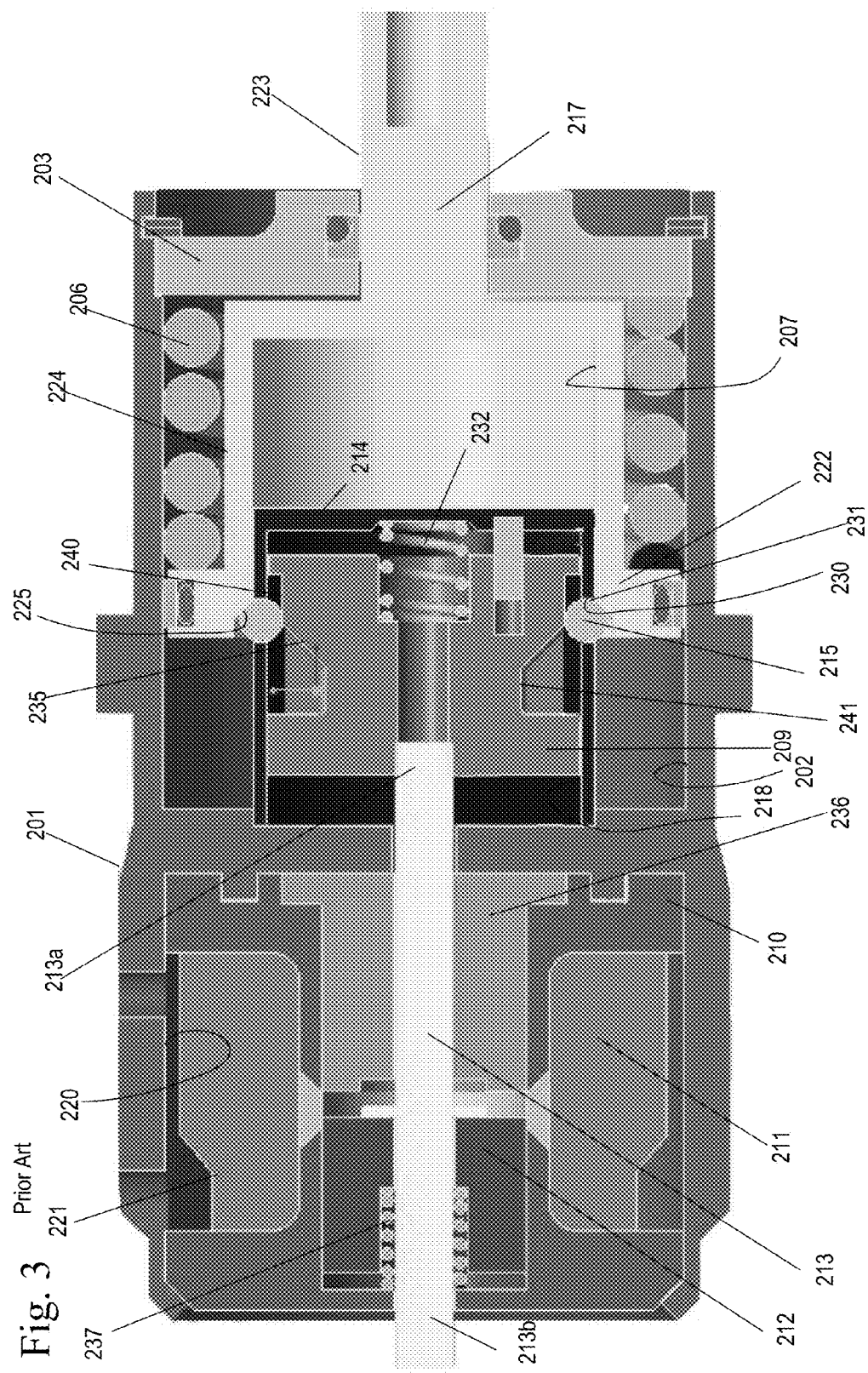
FIG. 3 shows an unreleased position of another prior art actuator.
Figure 4:
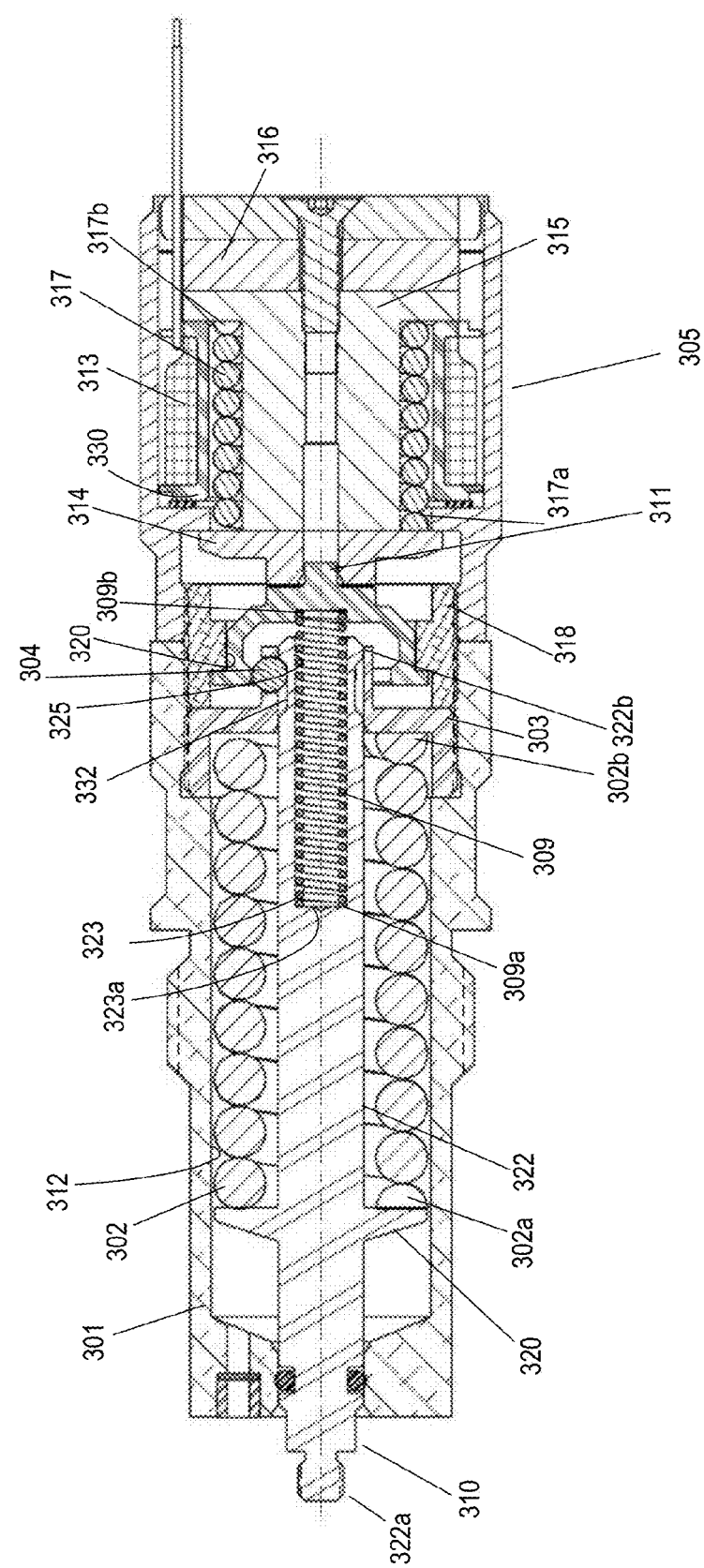
FIG. 4 shows a pin mechanism in an unreleased position with the solenoid assembly in a de-energized state.
Figures 5, 6:
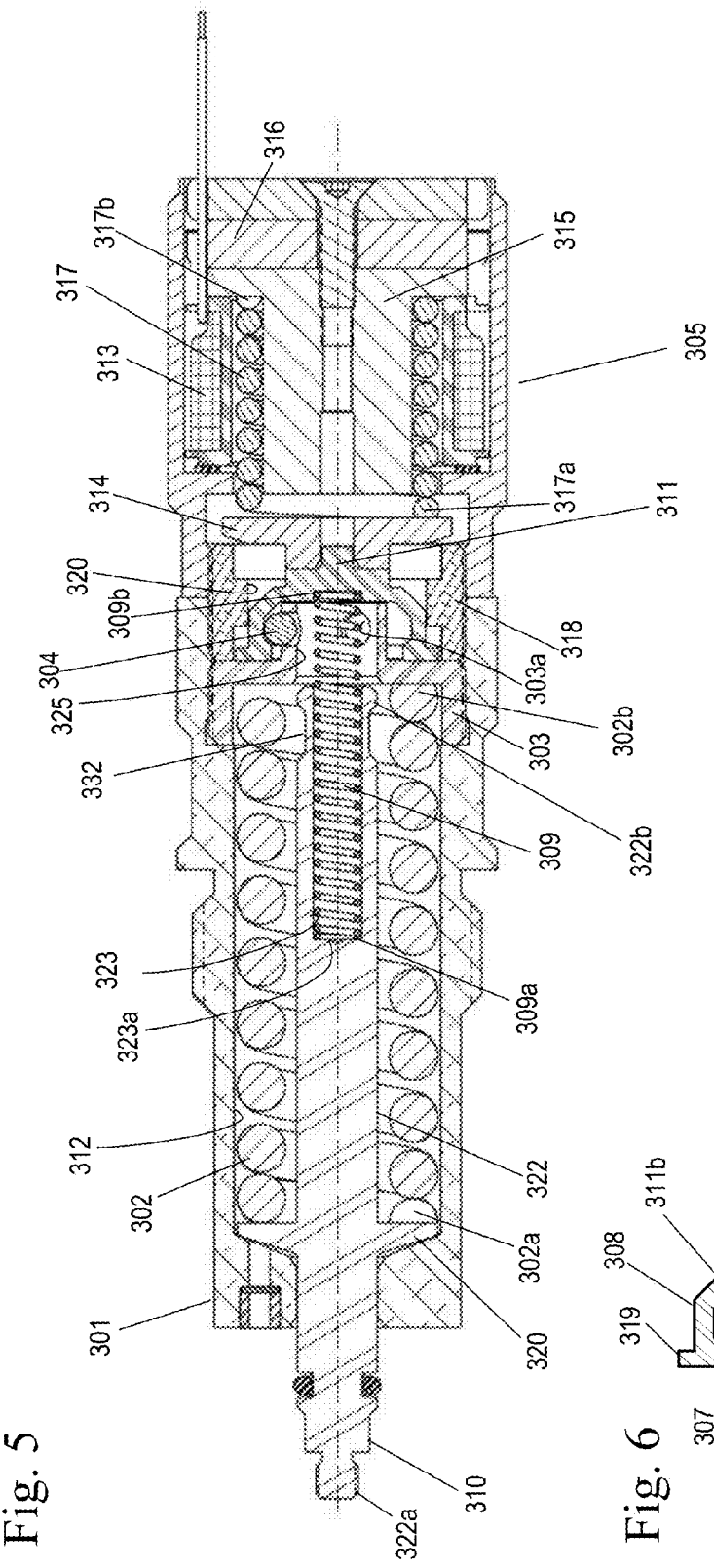
FIG. 5 shows a pin mechanism in a released position with the solenoid assembly in an energized state.
FIG. 6 shows an enlarged view of a ball retainer of the pin mechanism.

FIGS. 4-5 show a pin mechanism for releasing a pin. The pin mechanism of the present invention allows for high force values to be achieved over longer strokes with the use of an optimized solenoid package size.

The pin mechanism of the present invention has a spring housing 301 with a bore 312. Slidably received within the first end of the bore 312 is a release pin 310 with a shaft portion 322 extending a length from a first end 322a to a second end 322b.

Along the length of the shaft portion, near the first end 322a is a head portion 320. The head portion 320 acts as a spring retainer for a release spring 302. The release spring 302 surrounds the shaft portion 322 of the release pin 310, with a first end 302a of the release spring 302 in contact with the head portion 320 of the release pin 310 and a second end 302b of the release spring 302 in contact with a spring guide 303. The release spring 302 moves the release pin 310 outward from the housing 301, or away from the solenoid assembly 305 while the second end 302b of the release spring 302 remains stationary and in contact with the spring guide 303.

An outer surface of the shaft portion 322 near the second end 322b has a ramp section 332. The shaft portion 322 has a bias spring bore 323 extending from the second end 322b. The second end 322b of the shaft portion 322 is slidably received by a bore 325 defined by a spring guide 303.

A compressed bias spring 309 is present within the bias spring bore 323 with a first end 309a of the spring 309 in contact with an end 323a of the bias spring bore 323 and the second end 309b of the bias spring 309 in contact with an interior 311a of a slidable U-shaped ball retainer 311.

Referring to FIG. 6, the slidable U-shaped ball retainer 311 has an interior 311a, an exterior 311b, with the interior 311a being defined by legs 308. Each of the legs 308 has a leg flat 307 and a pocket 306 along the interior 311a and a leg tab 319 which extends radially from the exterior 311b of the ball retainer 311. The pocket 306 has a stop ramp 306a joined to a flat 306b. The flat 306b is further connected to a second ramp 306c.

Within a second end of the bore 312 of the housing 301 is a solenoid assembly 305. The solenoid assembly 305 includes at least one coil 313 connected to a power source (not shown), a bobbin 330, a stator 315, a permanent magnet 316, an armature spring 317, and a moveable armature 314. The moveable armature 314 is made of a material that is attracted by the permanent magnet 316.

A first end 317a of the armature spring 317 is in contact with the moveable armature 314 and the second end 317b of the armature spring 317 is in contact with the stator 315. The moveable armature 314 is connected to an outer curved portion of the U-shaped ball retainer 311 allowing movement of both the moveable armature 314 and the ball retainer 311 within the bore. The travel of the ball retainer 311 is limited and guided by a threaded insert 318. The threaded insert 318 has a protrusion 320 in which the leg tabs 319 of the U-shaped ball retainer 311 engage. Therefore, the travel of the ball retainer 311 and the moveable armature is limited to the distance between the protrusion 320 of the threaded insert and the spring guide 303.

The moveable armature 314 remains in place by a combination of the force of the bias spring 309 and the magnetic attraction force generated by the magnet 316 of the solenoid assembly 305. Working against the magnetic force of the magnet 316 and the force of the bias spring 309 is a force generated by the armature spring 317.

When power is applied to the coil 313, changing the solenoid from a de-energized state into an energized state, a magnetic force is generated by the coil 313 and transmitted to the stator 315. This magnetic force nulls, or negates the attraction of the force generated by the permanent magnet 316 on the moveable armature 314. Without the attraction of the permanent magnet 316, the force of the armature spring 317 is greater than the force of the bias spring 309, pushing the moveable armature 314 towards the head portion 320 of the released pin 310 or away from the solenoid assembly 305. This movement is transferred to the ball retainer 311 through the movement of the armature 314.

Ball bearings are present within a notch 303a of the spring guide 303. While only one ball bearing is shown, multiple ball bearings would be present within notches 303a of the spring guide. The ball bearings 304 freely move between the notches 303a of the spring guide 303, shifting out of the ramp section 332 of the release pin 310 and into the pocket 306 of the ball retainer 311. The ball bearings 304 are maintained within the notches 303a of the spring guide 303 by the ball retainer 311 on the outer diameter of the ball bearings 304 and by the spring 309 on the inner diameter of the ball bearings 304.

When the solenoid is in the energized state, the ball bearings 304 in the notch 303a of the spring guide 303 seat in a pocket 306 of the ball retainer 311, with the ball bearing contacting the stop ramp 306a and the flat 306b of the pocket 306.

When the solenoid is in the de-energized state, the ball bearings 304 no longer contacts the pocket 306 of the ball retainer 311, instead, the ball bearings 304 contact the leg flats 307 of the ball retainer 311 and the ramp section 332 of the second end 322b of the shaft portion 322 of the release pin 310.

When the pin mechanism is in the unreleased position and the solenoid 305 is in a de-energized state as shown in FIG. 4, the head portion 320 of the release pin 310 is not in contact with the end of the bore 312 of the spring housing 301 and the release spring 302 is compressed. The ball bearings 304 are held in place on the ramp section 332 by the spring guide 303 and the leg flats 307 of the ball retainer 311. The bias spring 309 remains compressed.

The pin mechanism is statically balanced when the solenoid assembly 305 is de-energized. The release spring 302 generates a high amount of potential energy; this force is transmitted to the ball bearings 304 and is reacted by a combination of; cross-drillings located in the spring guide 303, the ramp section 332 of the release pin 310 and the leg flats 307 of the interior 311a of the ball retainer 311.

The ball retainer 311 is captured and locked into place or prevented from traveling further within the bore by the protrusion 320 of the threaded insert 318. A bias spring 309, holds the ball retainer 311 against the threaded insert 318.

As the ball retainer 311 begins movement, friction between the ball bearings 304 and the interior 311a of the ball retainer 311 has a load and reacts against the force of the armature spring 317. The force of the armature spring 317 is greater than the frictional load, moving the ball bearings out of the ramp section 332 of the second end 322b of the shaft portion 322 of the release pin 310 into the pockets 306 of the ball retainer 311. Once the ball bearings 304 are in the pockets 306, the spring force of the release spring 302 continues to move the release pin 310 away from the solenoid assembly 305 until the head portion 320 contacts the bore 312 of the housing, moving the pin mechanism to a released position.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pin release mechanism comprising:
   a release pin axially movable from a first position to a second position;
   a bias spring connected to the release pin and exerting a force biasing the release pin towards the second position;
   a spring guide for receiving the bias spring and having a plurality of notches for interacting with a plurality of ball bearings;
   a moveable ball retainer connected to the bias spring and having a locked position in which a plurality of ball bearings radially interfere with the movement of the release pin and prevent movement of the release pin from the first position to a second position by engaging the release pin, and an unlocked position in which the plurality of ball bearings may move radially, disengaging the release pin, and engaging the ball retainer, to allow the release pin to move from the first position towards the second position; and
   a solenoid assembly comprising:
      a movable armature coupled to the ball retainer for moving the ball retainer between the locked position and the unlocked position;
      an armature spring exerting a spring force biasing the movable armature to move the ball retainer toward the unlocked position;
      a permanent magnet exerting a magnetic force on the movable armature, attracting the movable armature to move the ball retainer toward the locked position, the magnetic force of the permanent magnet on the movable armature being sufficient to overcome the spring force of the armature spring to hold the movable armature with the ball retainer in the locked position; and
      a coil, which when energized exerts a magnetic force on the movable armature opposite to the magnetic force of the permanent magnet, such that when the coil is energized, the magnetic force of the permanent magnet is overcome, allowing the spring force of the armature spring to move the ball retainer toward the unlocked position, permitting movement of the release pin from the first position to the second position by the force of the bias spring.

2. The pin release mechanism of claim 1, wherein the moveable ball retainer comprises a pair of legs, each of the legs having a leg flat, a pocket, and a leg tab extending radially from an exterior of the ball retainer.

3. The pin release mechanism of claim 2, wherein in the locked position, the plurality of ball bearings engages the leg flat of the ball retainer, the release pin, and the notch of the spring guide.

4. The pin release mechanism of claim 2, wherein in the unlocked position, the plurality of ball bearings engages the pocket of the ball retainer, the notch of the spring guide.

\* \* \* \* \*